US008079572B2

(12) United States Patent
Schaefer et al.

(10) Patent No.: US 8,079,572 B2
(45) Date of Patent: Dec. 20, 2011

(54) DEVICE FOR GASSING A LIQUID (75) Inventors: Stefan Schaefer, Aachen (DE); Klaus Vossenkaul, Aachen (DE); Dirk Volmering, Aachen (DE); Darren Lawrence, LP Putten (NL)

(73) Assignee: Koch Membrane Systems GmbH, Aachen (DE)

( * ) Notice: Subject to any disclaimer, the term of this patent is extended or adjusted under 35 U.S.C. 154(b) by 332 days.

(21) Appl. No.: 12/311,065

(22) PCT Filed: Sep. 17, 2007

(86) PCT No.: PCT/EP2007/008063
§ 371 (c)(1),
(2), (4) Date: Apr. 6, 2009

(87) PCT Pub. No.: WO2008/034570
PCT Pub. Date: Mar. 27, 2008

(65) Prior Publication Data
US 2010/0013110 A1    Jan. 21, 2010

(30) Foreign Application Priority Data
Sep. 19, 2006   (DE) .................. 10 2006 044 624

(51) Int. Cl.
*B01F 3/04* (2006.01)
(52) U.S. Cl. .................. 261/77; 261/121.1; 261/123
(58) Field of Classification Search .......... 261/77, 261/121.1, 122.1, 123, 124; 210/220, 221.2
See application file for complete search history.

(56) References Cited

U.S. PATENT DOCUMENTS

| 4,169,873 A * | 10/1979 | Lipert .................. 261/121.1 |
| 4,215,082 A * | 7/1980 | Danel .................. 261/124 |
| 4,278,546 A * | 7/1981 | Roesler .................. 210/626 |
| 4,293,506 A * | 10/1981 | Lipert .................. 261/77 |
| 4,356,131 A * | 10/1982 | Lipert .................. 261/77 |
| 4,504,388 A * | 3/1985 | Desbos et al. .................. 210/130 |
| 4,569,804 A * | 2/1986 | Murphy .................. 261/77 |
| 4,789,503 A * | 12/1988 | Murphy .................. 261/77 |
| 4,911,838 A * | 3/1990 | Tanaka .................. 210/221.2 |
| 5,888,391 A | 3/1999 | Meshengisser et al. |
| 6,237,898 B1 * | 5/2001 | Lafont .................. 261/77 |
| 2003/0102580 A1 * | 6/2003 | Khudenko .................. 261/77 |

FOREIGN PATENT DOCUMENTS

| DE | 295 20 683 | 4/1996 |
| DE | 203 00 546 | 5/2004 |
| EP | 0 389 230 | 9/1990 |
| FR | 2 352 580 | 12/1977 |
| FR | 2 437 866 | 4/1980 |
| WO | WO 97/06880 | 2/1997 |

OTHER PUBLICATIONS

International Search Report, (PCT/EP2007/008063), Dec. 21, 2007.

* cited by examiner

*Primary Examiner* — Richard L Chiesa
(74) *Attorney, Agent, or Firm* — Collard & Roe, P.C.

(57) ABSTRACT

A device for gassing a liquid, particularly for membrane facilities used in immersion operation, has a gas supply channel and at least one gas lance from which a gas flow exits in gassing operation. The gas lance is connected to the gas supply channel via at least one connection channel including a first mouth area on the side of the gas lance and a second mouth area on the side of the gas supply channel and generating as a throttle a flow pressure loss of the gas flow entering the gas lance. Below the first mouth area an extension section is provided, which adjoins the gas lance and has an opening below the first mouth area.

15 Claims, 11 Drawing Sheets

DEVICE FOR GASSING A LIQUID

CROSS REFERENCE TO RELATED APPLICATIONS

This application is the National Stage of PCT/EP2007/008063 filed on Sep. 17, 2007, which claims priority under 35 U.S.C. §119 of German Application No. 10 2006 044 624.0 filed on Sep. 19, 2006. The international application under PCT article 21(2) was published in English.

The present invention relates to a device lance for gassing a liquid having a gas supply channel and at least one gas lance, connected to the gas supply channel, from which a gas flow exits in gassing operation. The device is to be suitable in particular for membrane facilities used in immersion operation, the rising gas bubbles being used for cleaning the membranes.

In practice, gassing devices which have a gas supply channel and multiple gas lances branching from the gas supply channel are used for gassing membrane facilities employed in immersion operation. The gas supply channel is oriented essentially horizontally. The gas lances extend vertically upward and are surrounded by the liquid to be gassed. Such a gassing device is known from the publication WO 97/06880, the gas lances projecting at an upper, open end into the liquid to be gassed and at a lower, beveled end into the gas supply channel. Liquid may penetrate unimpeded into the gas supply channel between the gassing intervals, deposits being able to form in the gas lances. Varying pressure losses occur in the individual gas lances in the event of even slight cross-sectional changes of individual gas lances due to deposits, so that non-uniform bubbling of different gas lances is observed.

In order to avoid liquid penetrating into the gas lances and the gas chamber of the gas supply channel being flooded between gassing intervals, it is known from DE 203 00 546 U1 to provide the gas lances with caps, which are positioned on the projecting ends of the gas lances and annularly enclose an end section of the gas lances. During the gassing, air flows from top to bottom through the annular chamber between cap and gas lance and exits from the lower end of the annular gap. In long-term operation, the danger may exist that the annular gap will partially or entirely clog due to contaminants or formation of a biofilm. The gas lances connected in parallel do not have uniform flow through them because of the different flow resistances in the gas lances. In particular if a small gas quantity flow is used, the gassing is unstable and non-uniform. Water which penetrates through the gas lances into the gas supply channel after a pressure reduction in the system may only be removed poorly from the gas chamber. Residues remain in the gas chamber of the system, which impair the operation of the gassing device in the long term.

The present invention is based on the object of specifying a gassing device which allows stable operation even at a small gas quantity flow and in which uniform impingement of gas lances situated in parallel is also made possible in particular. The gassing device is also to be maintenance-friendly.

According to the present invention the object is achieved by a device for gassing a liquid, particularly for membrane facilities used in immersion operation, having a gas supply channel and at least one gas lance from which a gas flow exits in gassing operation, wherein the gas lance is connected to the gas supply channel by means of at least one connection channel comprising a first mouth area on the side of the gas lance and a second mouth area from the side of the gas supply channel and generating as a throttle a flow pressure loss of the gas flow entering the gas lance, and wherein an extension section is provided below the first mouth area, which adjoins the gas lance and has an opening below the first mouth area.

The pressure existing in the liquid to be gassed acts on the chamber enclosed by the gas lance and the extension section both via a gas outlet opening at the upper end of the gas lance and also via the bottom opening of the extension section, the pressure at the lower opening of the extension section being greater than at the upper end of the gas lance because of the height of the liquid column enclosing the device. During operation of the gassing device, the bottom opening is used as a pressure equalizer and determines the pressure conditions in the gas lance, the throttle effect of the connection channel ensuring uniform flow of the supplied gas. In order to ensure a clearly defined throttle effect, each connection channel is always connected to only one gas lance, one gas lance being able to be connected via multiple connection channels to the gas supply channel without restriction, however. In particular in devices according to the present invention which have multiple gas lances in the embodiment described, the throttle effect of the connection channels and, in addition, the pressure equalization through the openings of the extension sections ensure uniform distribution of the entire gas flow to the individual gas lances and uniform bubbling of the gas lances.

The throttle effect of the connection channel, which generates a flow loss of the gas flow entering the gas lance, may be achieved in the scope of the present invention in that the connection channel has a throttle point, for example, in the form of a constriction or a nozzle opening. The connection channel may also have a cross-section over its length which is smaller than the cross-section of the gas lance and produces a flow pressure loss of the gas flow entering the gas lance. Without restriction, at least one gas lance may be connected via multiple connection channels or only one connection channel to the gas supply channel, a connection channel also being able to have multiple parallel constrictions or nozzle outlet openings. However, an embodiment in which only one flow path is provided in the connection channel is especially preferred, since with such an embodiment, at a predefined throttle effect, a comparatively greater flow cross-section is possible within the connection channel and the danger of clogging of the connection channel by deposits is thus reduced.

The connection channel is connected using a first mouth area to the gas lance and using a second mouth area to the gas supply channel. In a preferred embodiment of the present invention, the first mouth area is situated below the second mouth area, so that the connection channel, proceeding from the connection to the gas supply channel, extends downward. When the gassing device is put into operation, it is ensured that liquid which has penetrated into the gas supply channel is removed up to the height of the second mouth area from the gas supply channel. The second mouth area is especially preferably situated in the bottom of the gas supply channel, so that when the gassing device is put into operation, there is always complete residue emptying of the entire gas supply channel.

When a device according to the present invention operating in immersion operation is put into operation, liquid must be displaced by impingement using gas at least from the gas supply channel, the connection channel, the extension section, and the gas lance. The liquid leaves the device partially through the opening of the connection channel and partially through the gas lance, which is open on top. After the emptying of the gas chamber, the gas subsequently flows out through the gas lances. This is the normal operating state. Large gas flows result with gas lances of the gassing device which are situated in parallel. The openings of the extension sections provide a significant contribution to the gas lances situated in parallel having uniform flow through them, because it is ensured by the openings that defined pressure conditions result in each case in the flow direction behind the connection channel designed as a throttle.

In a preferred operating mode of the gassing device, the entire gas flow is conducted upward through the at least one gas lance, a pressure cushion being formed in the extension section because of the flow resistance in the gas lance. If a small quantity of gas is conveyed through the gas lances, liquid may enter through the opening of the connection section, which is conveyed upward in the gas lance with the gas flow. A pumping effect is observed, which typically increases with reduced gas flow rate and may support the cleaning process of the gas bubbles.

If, proceeding from the preferred operating mode, the pressure in the gas supply channel and thus the quantity of gas flowing through the gas lances is increased, the pressure cushion in the extension section expands until finally a part of the gas flow also escapes downward through the opening of the extension section. The additional gas flow exiting at the bottom of the gassing device may also be used for targeted gassing of the liquid. If the device according to the present invention is used in a membrane facility, for example, membrane bundles being situated around the gas lance, the additional gas flow coming out of the bottom of the device especially advantageously allows additional cleaning at the outer periphery and in the boundary zones of the membrane fiber bundle.

The gassing device may be operated intermittently. During intermittent operation, gassing intervals in which, in the preferred operating mode, a large gas or air flow is used alternate with intervals in which the gas flow is throttled enough that the pressure in the gas supply channel is maintained, but only a very slight or no gas quantity escapes through the at least one gas lance. Optionally, in intermittent operation—as described above—an additional gas flow may be generated at the bottom of the gassing device in the event of a very large gas or air flow. If the gassing device is operated using a small gas flow during the intermittent operation, the at least one gas lance is flooded by the surrounding liquid. A liquid column results in the gas lance, which extends up to the connection channel, but because of the higher pressure existing in the supply channel, does not pass through the connection channel into the gas supply channel. If the gas supply channel is again impinged with a large gas flow, the liquid is displaced from the gas lance, an air blast first escaping through the opening of the extension section and a part of the gas flow flowing upward through the gas lance. As soon as the liquid is displaced from the gas lance, the preferred operating mode is implemented, in which the entire gas flow flows out through the gas lance. In comparison to the known configuration described at the beginning, the pressure loss of the overall system is significantly less. Furthermore, the regulating range of the gas flow is greater. Even with a small gas quantity flow, uniform flow of the gas lance or the gas lances is ensured. A further advantage is that the device may be implemented in such a way that liquid may be removed without residue from the gas supply channel when the device is put into operation. In particular in the preferred embodiment of the device having multiple gas lances, a uniform flow through all gas lances in gassing operation is ensured.

Multiple possibilities result for the further constructive implementation of the device according to the present invention. Thus, the connection channel may adjoin the gas lance directly or also via a gap, such as an annular gap, as a throttle point. In one embodiment of the present invention, the connection channel passes continuously into the gas lance, the connection channel and the gas lance having the same cross-section. In an especially simple refinement of this embodiment, the gas lance and the extension section are implemented as sections of a tube, the gas lance extending above the connection channel and the extension section extending below the connection channel. The tube preferably has a round cross-section and may be shaped cylindrically or partially conically. With a linear tube, it may be cleaned especially easily, for example, using a brush or a pressurized jet, even in the mounted state.

A further embodiment of the device according to the present invention comprises a connecting piece attached to the gas supply channel. The gas lance extends up into a receiving chamber of the connecting piece, and a cover is located on the connecting piece, which is open on the bottom and forms the extension section. The cover may be inserted into the connecting piece, the connection channel preferably being formed in the cover. The cover may also be placed on the connecting piece. The at least one gas lance preferably extends into a receiving chamber of the connecting piece, the connection channel defined by the connecting piece having a throttle point at the end of the gas lance plunging into the receiving chamber. Multiple advantageous constructive refinements of the device according to the present invention result proceeding from such an embodiment.

The cover my have inner faces which enclose the end of the gas lance with an annular gap which forms the throttle point. The cover preferably also has a depression which is opposite the end of the gas lance and forms a flow calming chamber of the extension section. The cover-side opening discharges into the flow calming chamber.

According to a further embodiment of the invention, a throttle valve comprising two valve bodies is situated in an annular chamber delimited by the connecting piece and the gas lance, the first valve body being situated on the end of the gas lance and bridging the annular chamber between the gas lance and the connecting piece and also having gas passage openings. The second valve body has a valve seat which works together with the gas passage openings and is situated in a chamber between the cover and the first valve body. Furthermore, the second valve body can have a passage, which forms a flow calming chamber of the extension section behind the throttle point and aligns with the opening in the cover. The valve seat may be implemented as a conical or concave seat face. The first valve body may contain axial holes which discharge into a flow chamber annularly enclosing the end of the gas lance. The flow chamber and the seat face of the second valve body form a defined throttle gap. The two valve bodies are expediently connected to one another. With a screw connection, for example, the possibility exists of adjusting the width of the throttle gap between the two valve bodies. It is also within the scope of the present invention that the second valve body is an insert part, which is clamped by the cover against the first valve body. The first valve body may have a nozzle-shaped constricting gas inlet for the gas flowing into the lance.

The bottom-side opening of the extension section expediently has a cross-section which corresponds to 0.5 to 2 times the flow cross-section of the gas lance. The cross-sections of the opening and the flow cross-section of the gas lance preferably essentially correspond.

The gas lance preferably ends at its upper end projecting away from the gas supply channel freely in the liquid to be gassed, without a cap and without a constriction. It is also within the scope of the present invention, of course, that the gas lance is additionally provided with mantle-side openings.

Furthermore, it may be advantageous to implement the end of the gas lance at the gas outlet with a diffuser-type expansion of the flow cross-section.

The gassing device described is particularly intended for membrane facilities which are used in immersion operation. During use in a membrane facility, the at least one gas lance is preferably enclosed by a bundle of hollow fiber membranes, which are embedded at one open end in a head part and discharge into a permeate collection chamber separated from the gas supply channel.

The device according to the present invention preferably has multiple gas lances connected to the gas supply channel, each of which is implemented as described above. In an especially preferred embodiment, the device is assembled from individual segments each having a gas lance, the individual segments each being implemented as described above.

In the following, the present invention is explained on the basis of a drawing which merely illustrates an exemplary embodiment.

Figure 1A:
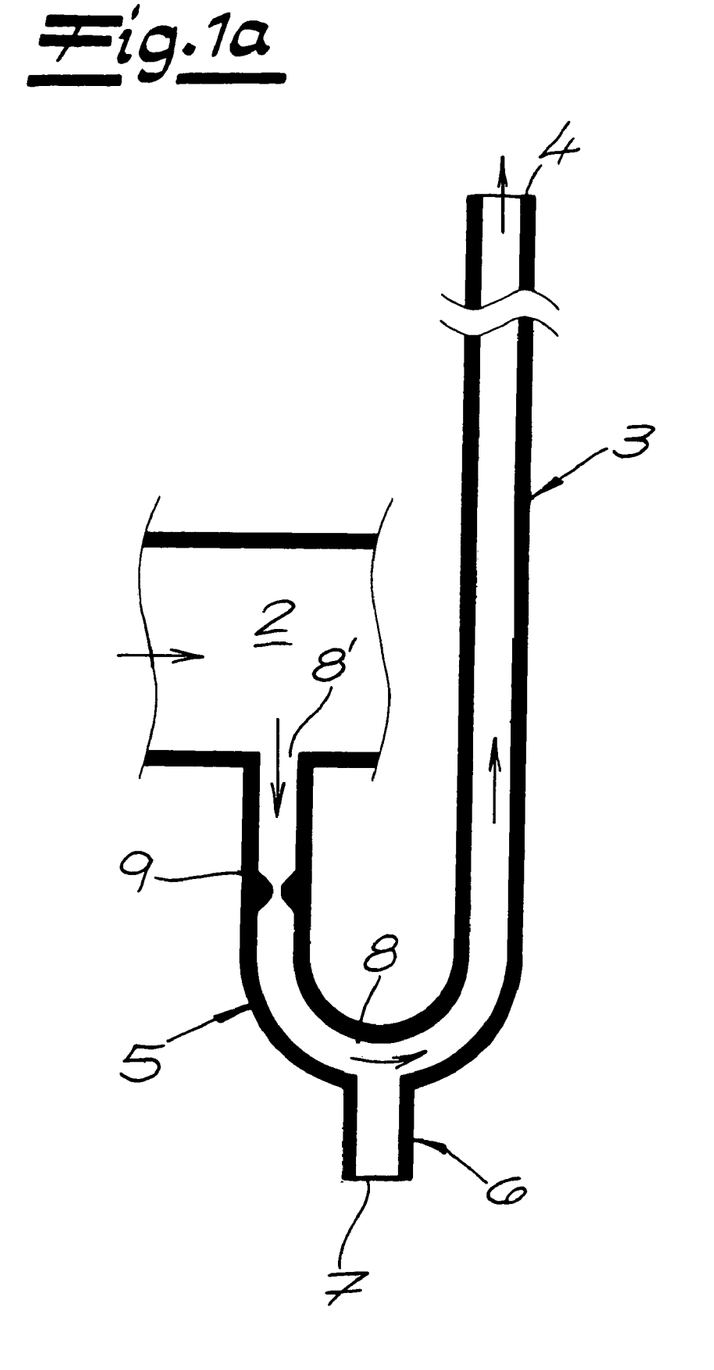
FIGS. 1a through 1g schematically show embodiments of a gassing device according to the present invention in a sectional illustration, FIGS. 2 through 4 schematically show a section through a gassing device according to the present invention during operation in different operating states, FIG. 5 schematically shows a detail of the device according to the present invention in an illustration enlarged in relation to FIGS. 2 through 4, FIG. 6 schematically shows a further embodiment of the subject matter illustrated in FIG. 4, FIGS. 7a through 7c schematically show different embodiments of the subject matter illustrated in FIG. 6, FIG. 8 schematically shows the use of the gassing device in a membrane module for a membrane facility used in immersion operation, FIG. 9a through 9c schematically shows alternative embodiments of the gassing device in a membrane module, FIG. 10 schematically shows a diagram in regard to the pumping effect of a gassing device according to the present invention at a low gas flow.
Figure 1B:
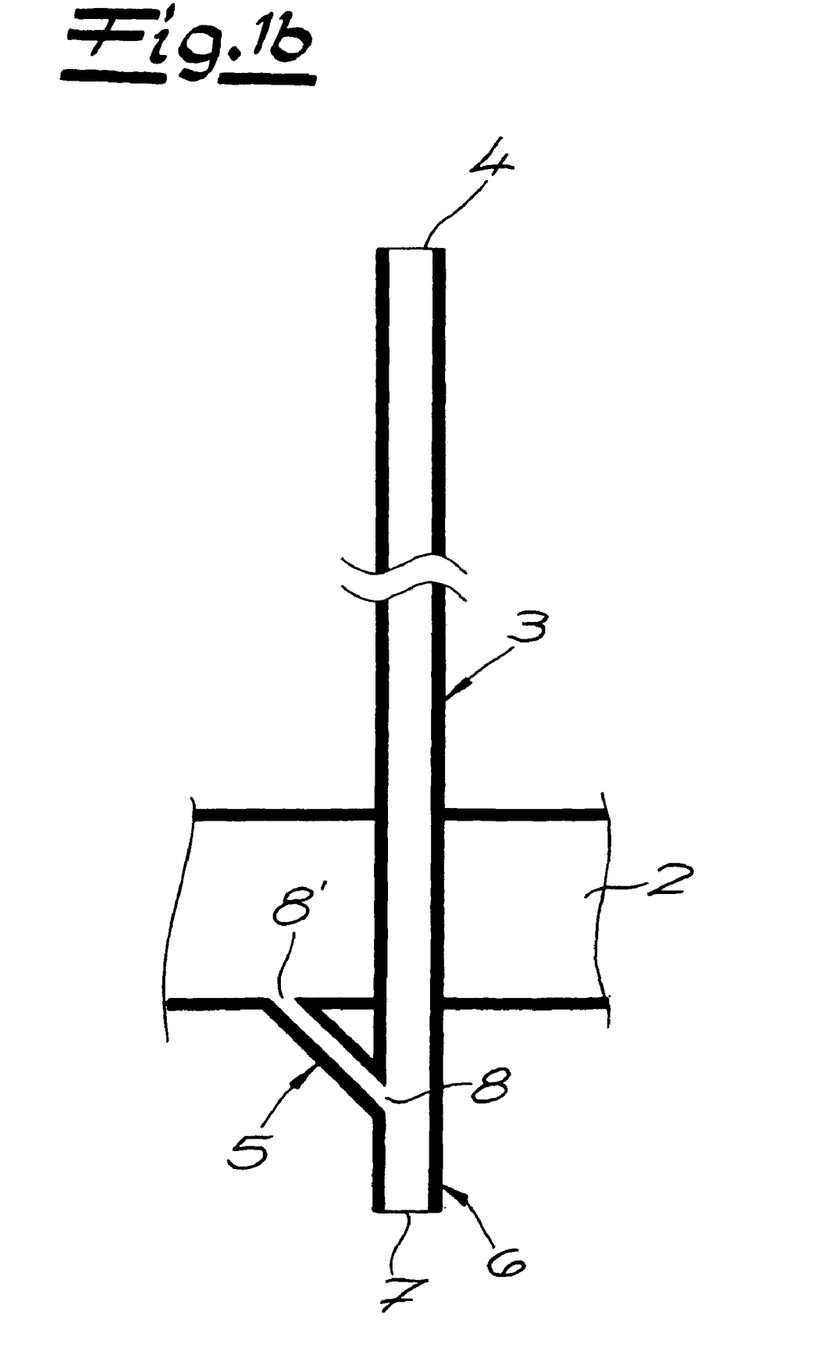
Figure 1C:
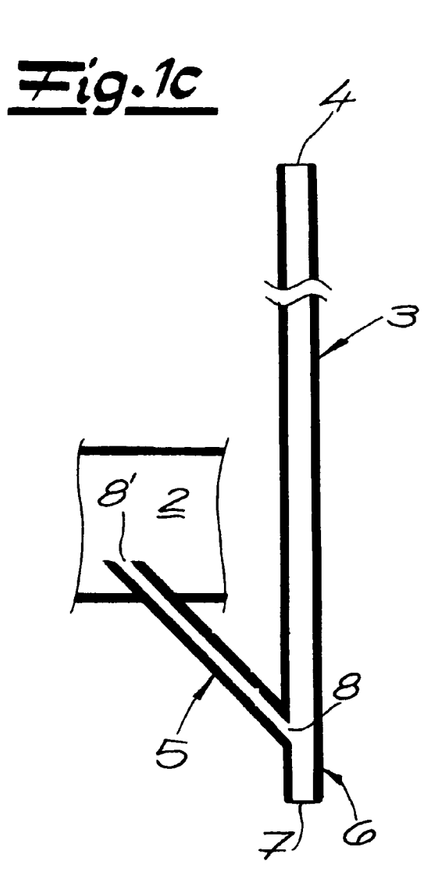
Figure 1D:
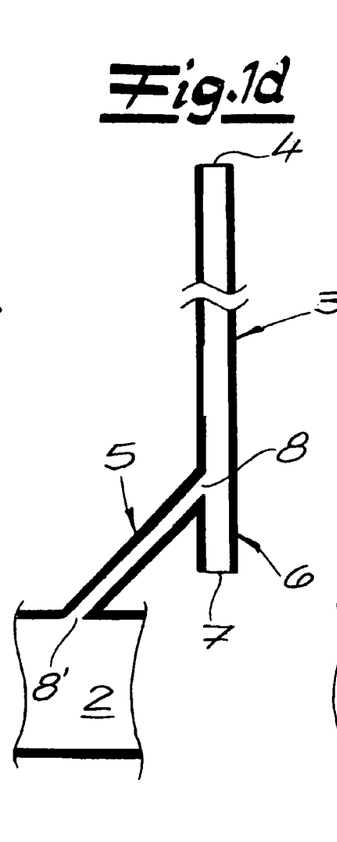
Figure 1E:
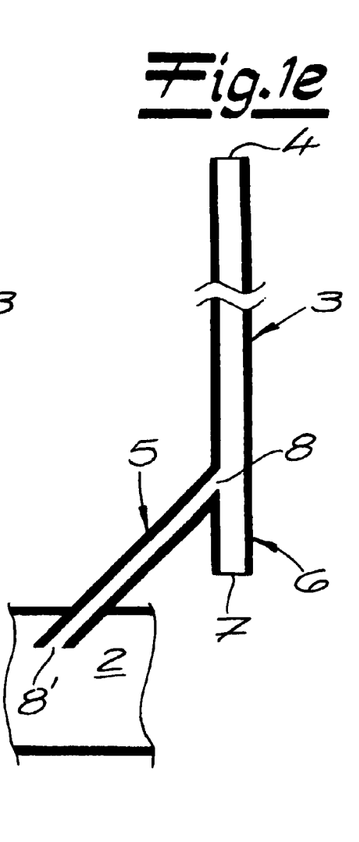

FIGS 1a through 1g show details of embodiments of a device according to the present invention for gassing a liquid 1 having a gas supply channel 2 and at least one gas lance 3 connected to the gas supply channel 2, from which a gas flow exits in gassing operation. The entire device preferably has further gas lances 3 (not shown), which are implemented correspondingly. The gas lance 3 extends vertically upward and has an open end 4 projecting from the gas supply channel 2 without a constriction and without a cap. The gas lance 3 is connected via a connection channel 5 to the gas supply channel 2, the connection channel 5 generating a flow pressure loss of the gas flow entering the gas lance 3 as a throttle and only one gas lance 3 always being connected to the connection channel 5. The connection channel 5 is connected using a first mouth area 8 to the gas lance 3 and using a second mouth area 8' to the gas supply channel 2, the gas lance 3 extending upward and an extension section 6 extending downward starting from the first mouth area 8. The extension section 6 adjoining the gas lance 3 has an opening 7 below the first mouth area 8. In the embodiments shown in FIGS. 1a and 1b, the first mouth area 8 is situated below the second mouth area 8'. When the device according to the present invention is put into operation, it is thus ensured that the liquid 1 which has collected in the gas supply channel 2 is first completely removed. In the embodiment shown in FIG. 1c, the connection channel 5 projects into the gas supply channel 2, the second mouth area 8' being situated above the bottom of the gas supply channel 2. If liquid 1 has collected in the gas supply channel 2, liquid 1 also remains in the gas supply channel 2 below the second mouth area 8' during operation. This prevents contaminants which have collected at the bottom of the gas supply channel 2 from reaching the connection channel 5. FIG. 1d shows an embodiment in which the connection channel 5 adjoins the top of the gas supply channel 2 using its second mouth area 8' and leads upward to the first mouth area 8, both the gas lance 3 and also the extension section 6 being situated above the supply channel 2. In the embodiment shown in FIG. 1e, the connection channel projects from above into the gas supply channel 2. If the gas supply channel 2 is completely filled with liquid 1 when put into operation, this liquid is first removed from the gas supply channel 2 up to the height of the second mouth area 8', the gassing starting practically simultaneously at all gas lances 3 subsequently in a configuration having multiple gas lances.

Figure 1F:
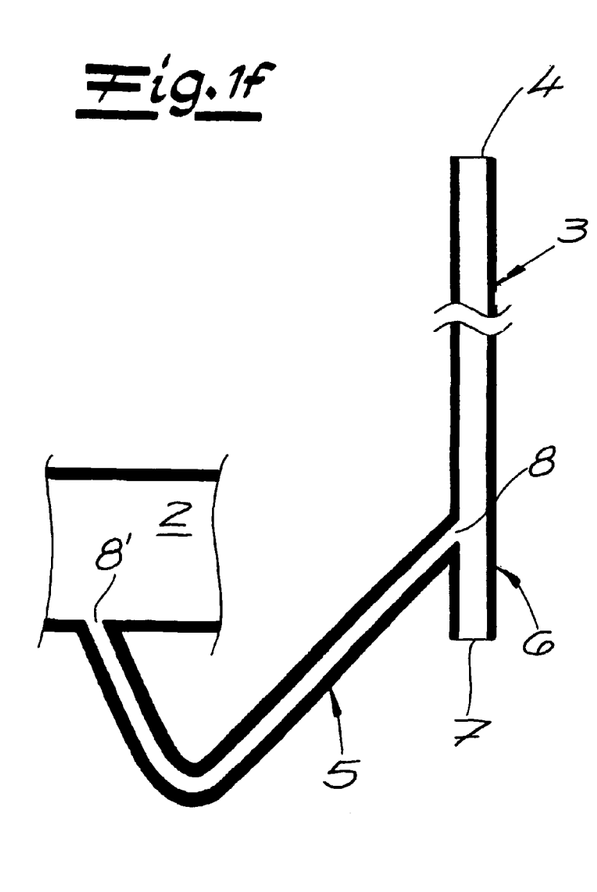
Figure 1G:
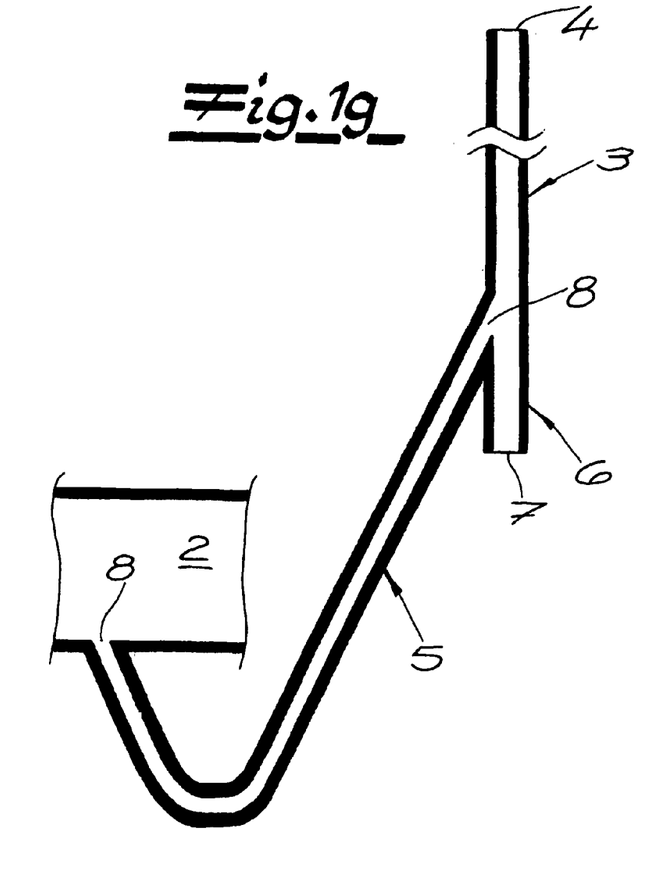

As may be inferred from FIGS. 1f and 1g, the connection channel 5 may also have an angled or curved course. Complete removal of collected liquid 1 is thus ensured in FIG. 1g as the device according to the present invention is put into operation, although the gas lance 3, the extension section 6, and the first mouth area 8 are situated above the gas supply channel 2.

While a throttle point 9 is provided in the connection channel in the embodiment from FIG. 1a, the connection channel 5 shown in FIG. 1b has a cross-section over its length which is smaller than the cross-section of the gas lance 3 and which generates a flow pressure loss of the gas flow entering the gas lance 3. In the embodiment from FIG. 1b, the gas lance 3 and the extension section 6 are implemented as sections of a linear tube, the gas lance 3 extending upward and the extension section 6 extending downward starting from the connection channel 5. The extension section 6 passes continuously into the gas lance 3, the extension section 6 and the gas lance 3 having equal cross-sections, so that the embodiment shown is easy to clean using a brush or a pressure jet, for example, even in the installed state.

Figure 2:
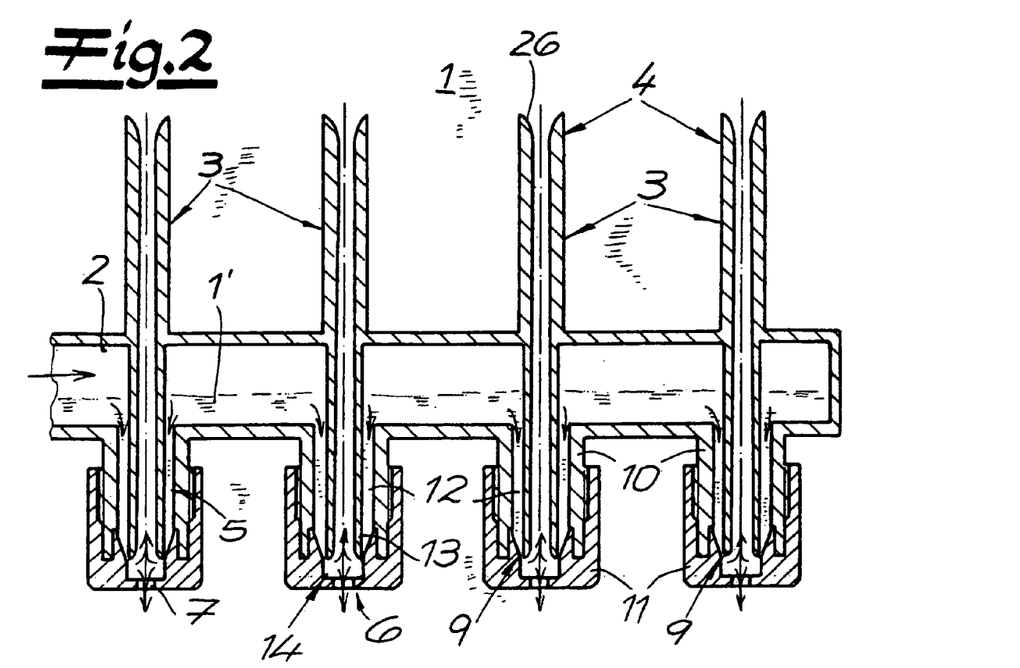
Figure 3:
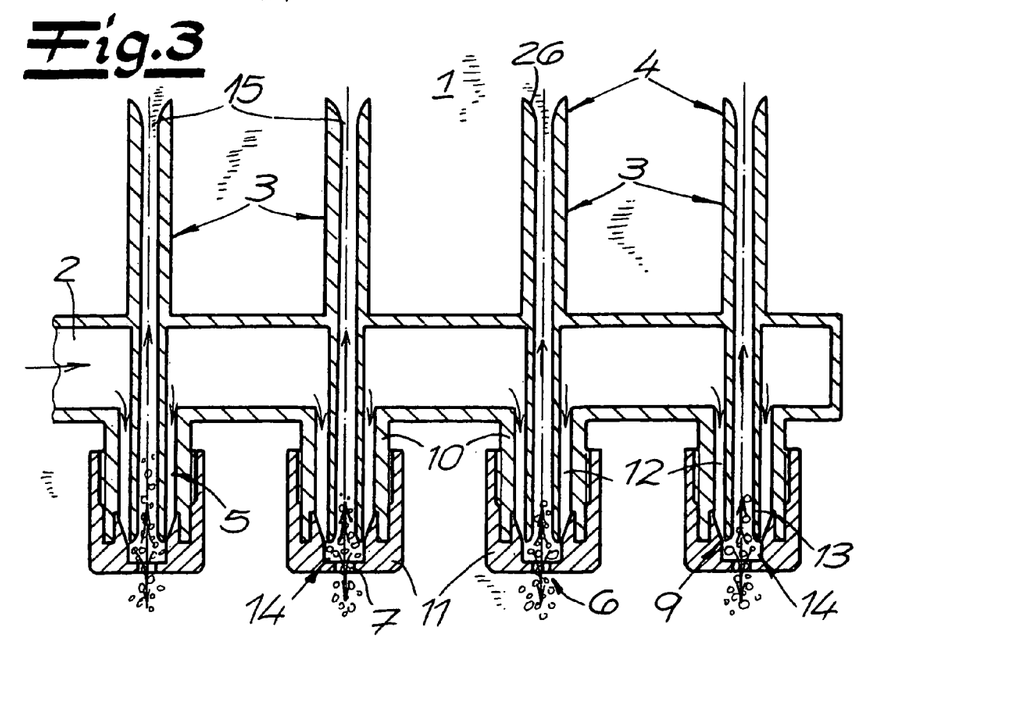
Figure 4:
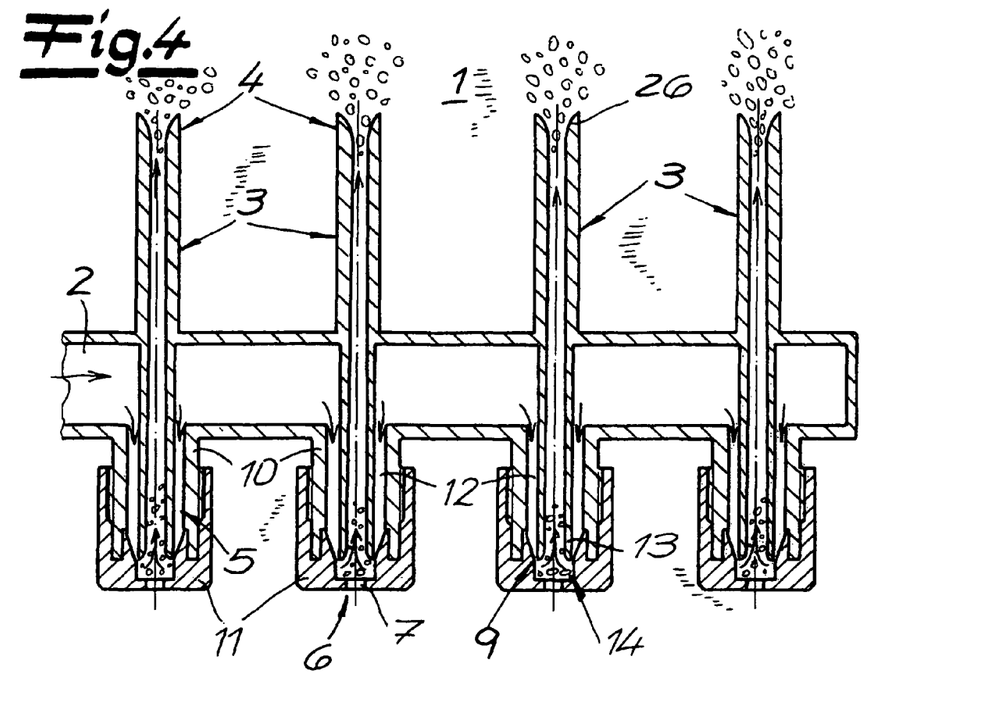
Figure 5:
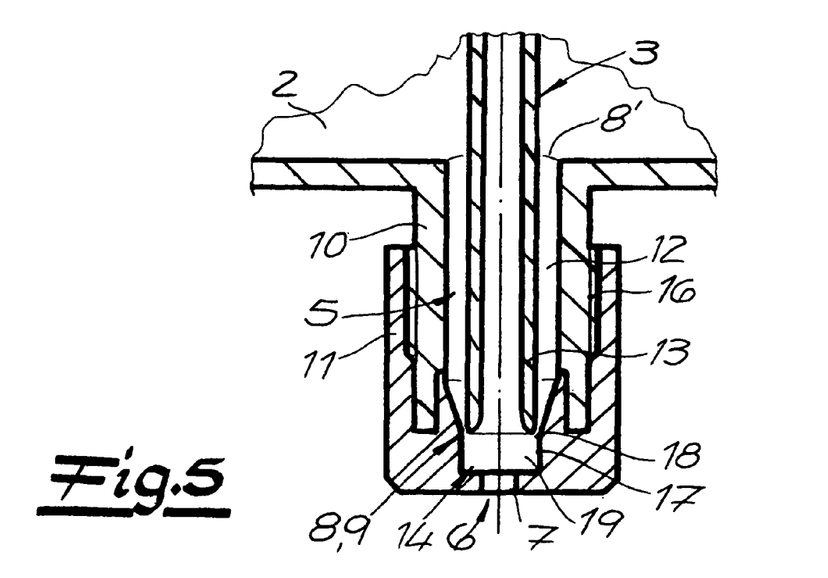

The devices shown in the Figures are used for gassing a liquid. The basic construction of the device includes a gas supply channel 2 and multiple gas lances 3 connected to the gas supply channel 2, from which gas flows exit simultaneously in gassing operation. The device is lowered into a liquid 1, the gas supply channel 2 being oriented essentially horizontally (FIG. 2 through 4). The gas lances 3 extend vertically upward and end freely in the liquid 1 to be gassed at their end 4 projecting from the gas supply channel 2 without a cap. The gas supply channel 2 comprises connecting pieces 10 branching from the gas supply channel, which are closed at the end by a cover 11, the cover 11 forming the extension section 6. The gas lances 3 extends up into a receiving chamber 12 of the connecting piece 10, a throttle point 9 in the connection channel 5 being provided at the end of the gas lances 3 immersed in the receiving chamber, which generates a flow pressure loss of the gas flow entering the gas lance 3. It may also be seen from illustrations in FIGS. 2 through 9c that the opening 7 is provided in the covers 11 positioned on the connecting pieces 10, which discharges into the flow chamber 14 of the extension section 6 behind the throttle point 9. The covers 11 are removably connected to the connecting pieces 10. After removal of the cover 11, the throttle points 9 are accessible and the gas lances 3 may be cleaned easily. Cleaning is also possible through the opening 7.

FIG. 2 shows the device being put into operation after it has been lowered into the liquid 1 to be gassed. The gas supply channel 2 contains liquid 1', which has penetrated through the gas lances 3, which are open on top, into the gas chamber. The gas supply channel 2 is now impinged with pressure and a gas flow is supplied. The gas or air flow supplied under pressure displaces the liquid 1' from the gas supply channel 2. The liquid 1' flows into the bottom connecting pieces 10 and leaves the device through the openings 7 in the gas lances 3, which are open on top.

When the liquid 1' has been displaced from the receiving chamber 12 of the connecting piece 10, the operating state shown in FIG. 3 briefly results. The gas flow flows through the throttle point 9 and displaces the liquid column 15 inside the gas lances 3. A part of the gas flow exits in the form of a brief pulse through the cover-side openings 7. As soon as the liquid column 15 has been displaced from the gas lances 3, the operating state shown in FIG. 4 results. The entire gas flow flows through the gas lances 3 upward, equal quantity gas flows resulting in the gas lances 3. No gas exits at the bottom openings 7 of the covers 6 in the operating mode shown, since the liquid pressure at the cover-side openings 7 is greater than the liquid pressure at the upper outlet-side, projecting end 4 of the gas lances 3. Defined and equal pressure conditions result in all gas lances 3 through the cover-side openings 7, which results in the flow through the gas lances 3 situated in parallel occurring using equal gas quantity flows.

The covers 11 are implemented as caps or inserts and are removably connected to the connecting pieces 10, for example, by a screw connection 16. In the exemplary embodiment shown in FIG. 5, the covers 11 have inner faces 17 which enclose the end 13 of the gas lances 3 using an annular gap 18, which forms the throttle point 9. The covers 11 also each have a depression which is opposite the end 13 of the gas lances 3 and forms a flow calming chamber 19. The cover-side opening 7 discharges into the flow calming chamber 19.

Figure 6:
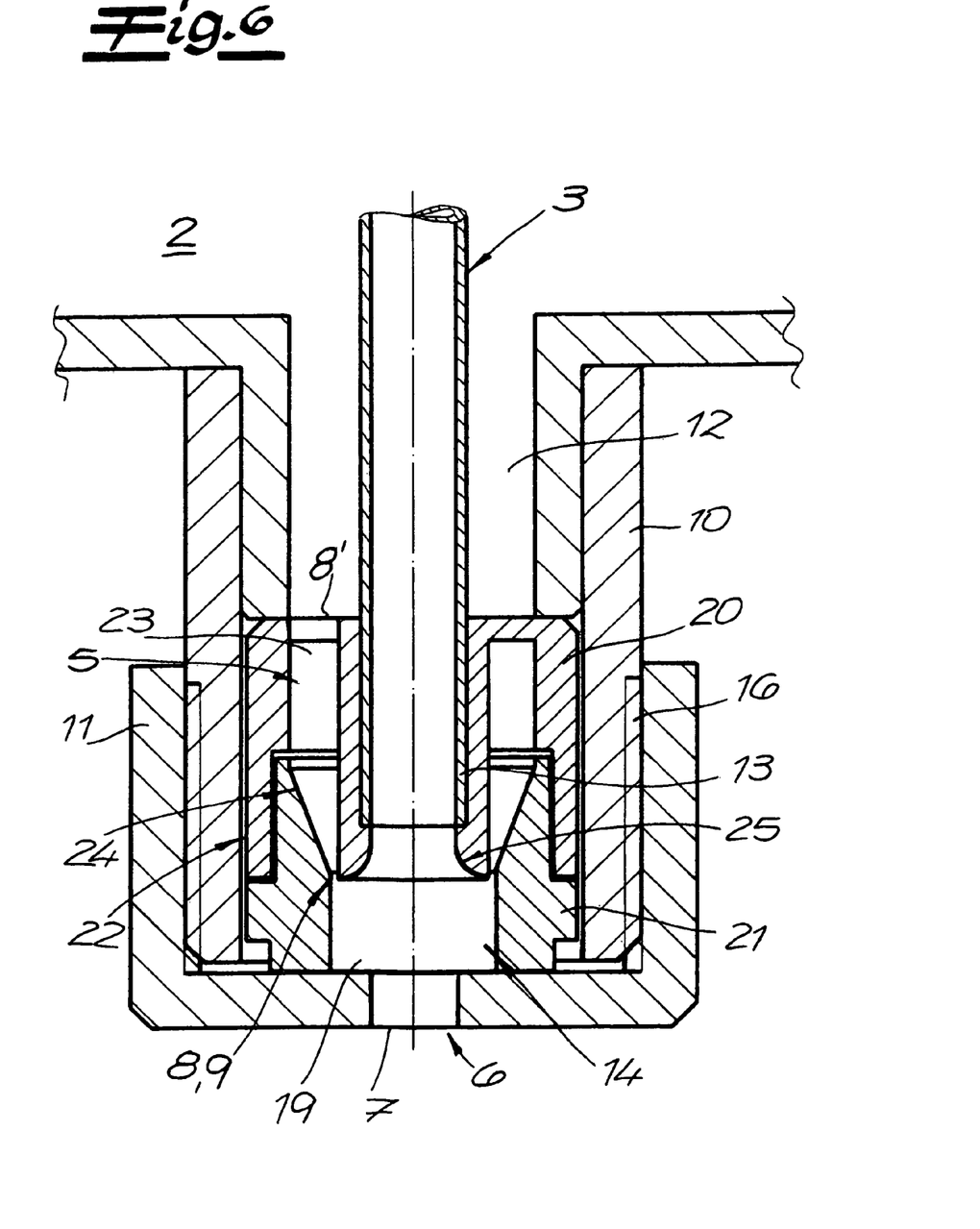
Figure 7A:
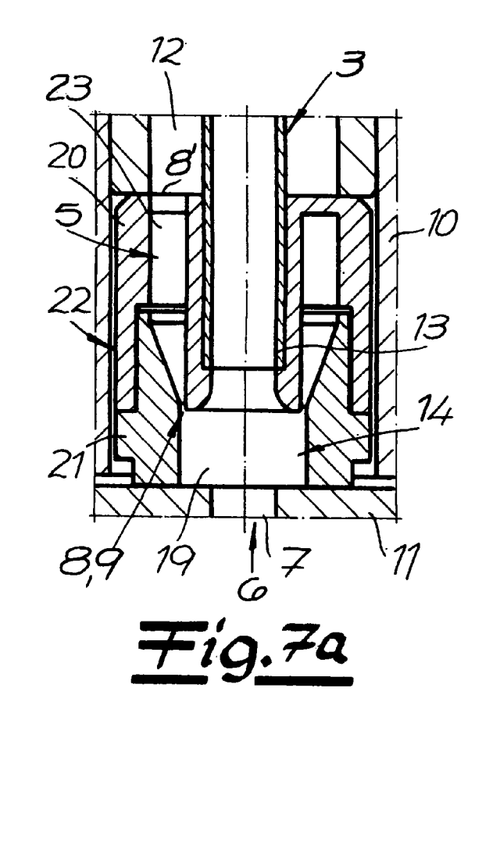
Figures 7B, 7C:
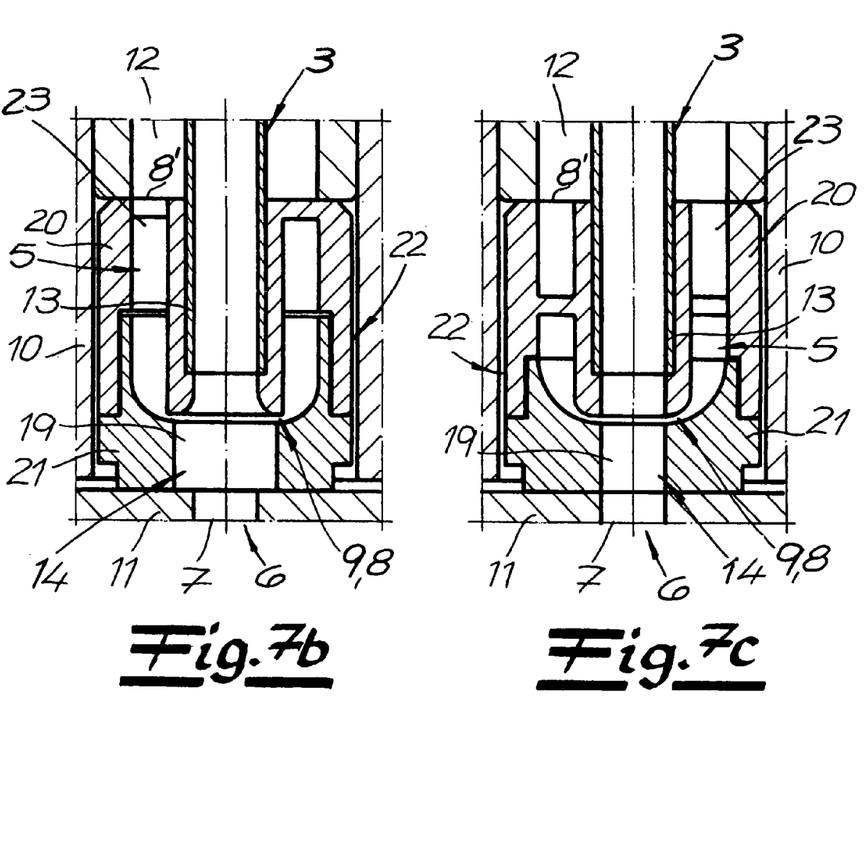

In the exemplary embodiment of FIG. 6, a throttle valve 22 comprising two valve bodies 20, 21 is arranged in each annular chamber delimited by a connecting piece 10 and a gas lance 3. The first valve body 20 is situated on the end 13 of the gas lance 3, bridges the annular chamber between the gas lance 3 and the connecting piece 10, and has gas passage openings 23. The second valve body 21 has a valve seat 24 which works together with the gas passage openings 23 and is situated in a chamber between the cover 11 and the first valve body 20. The second valve body 21 contains a passage which forms a flow calming chamber 19 behind the throttle point 9. It may be seen from FIG. 6 as well as FIGS. 7a through 7c that the valve seat 24 may be implemented as a conical or concave seat face. The first valve body 20 has multiple axial holes distributed around the circumference as gas passage openings 23, which discharge into a flow chamber 14 annularly enclosing the end 13 of the gas lance 3. The flow chamber 14 forms a throttle point 9 with the seat face of the second valve body 21. The first valve body 20 may also have a nozzle-shaped constricting gas inlet 25 for the gas flowing into the gas lance 3. In the exemplary embodiments of FIG. 7c, the passage of the second valve body 21, which forms a flow calming chamber 19 behind the throttle point 9, is aligned with the opening 7 in the cover 11.

The openings 7 of the extension sections 6 situated in the covers 11 have a cross-section which preferably corresponds to 0.5 to 2 times the flow cross-section of the gas lances 3. In the exemplary embodiments, the cross-section of the cover-side openings 7 and the flow cross-section of the gas lances 3 are approximately equally large.

The outlet-side, projecting end 4 of the gas lances 3 has a diffuser-type expansion 26 according to a preferred embodiment of the present invention in the exemplary embodiments of FIGS. 2 through 8.

Figure 8:
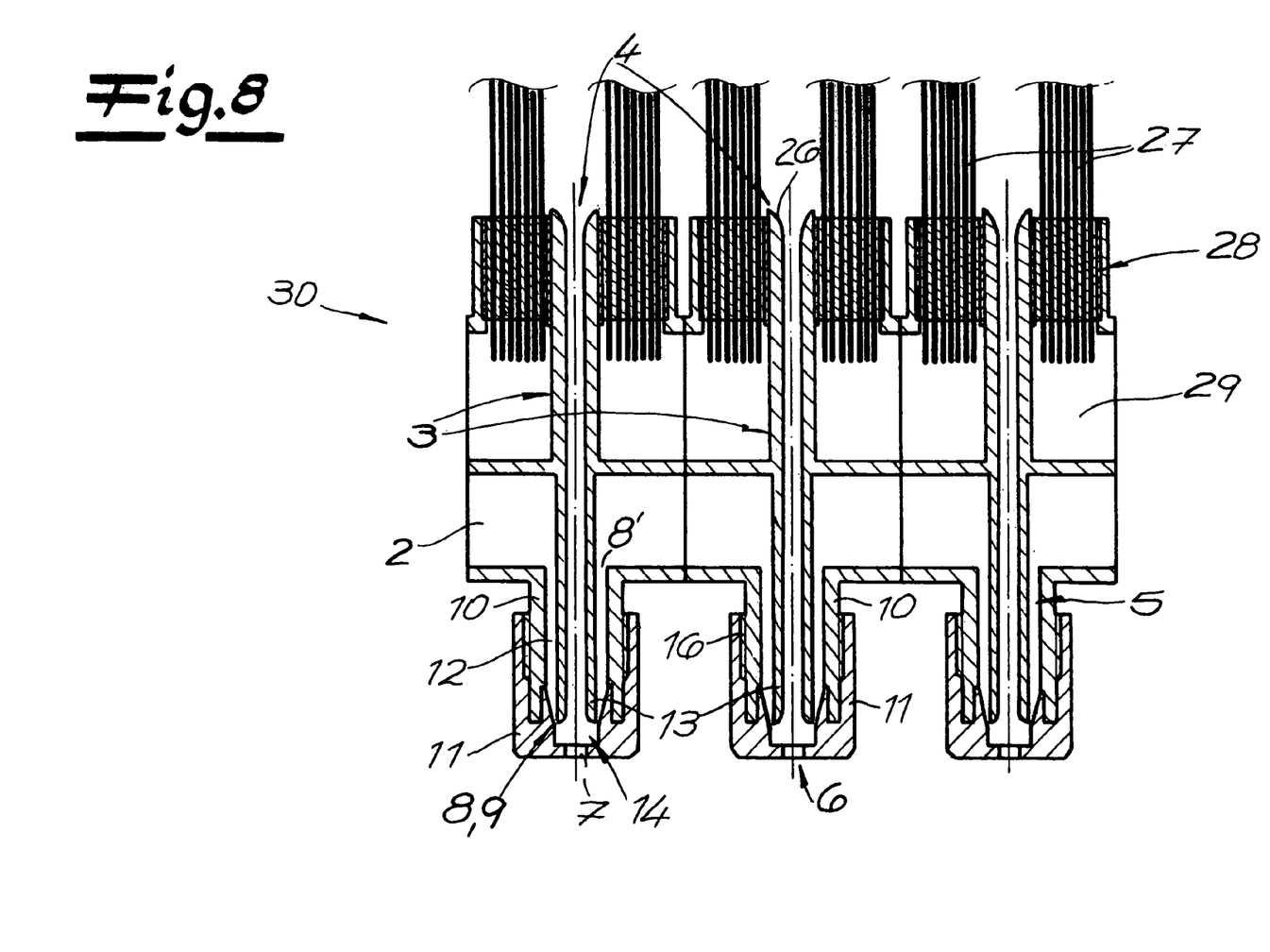

The gassing device is suitable for membrane facilities which are used in immersion operation. The membrane facilities may have membrane bundles, membrane plates, or other membrane elements, the gas rising from the gassing device at the edge of the membranes or inside a membrane bundle and cleaning the membrane. The outlet-side, projecting end 4 of the gas lances 3 is enclosed in the embodiment shown by a bundle 27 of hollow fiber membranes, which are embedded at one open end in a head part 28 and discharge into a permeate collection chamber 29 separated from the gas supply chamber 2. The units, as shown in FIG. 8, may be assembled into an array or a membrane module 30, in which a gassing unit implemented according to the present invention is integrated.

Figure 9A:
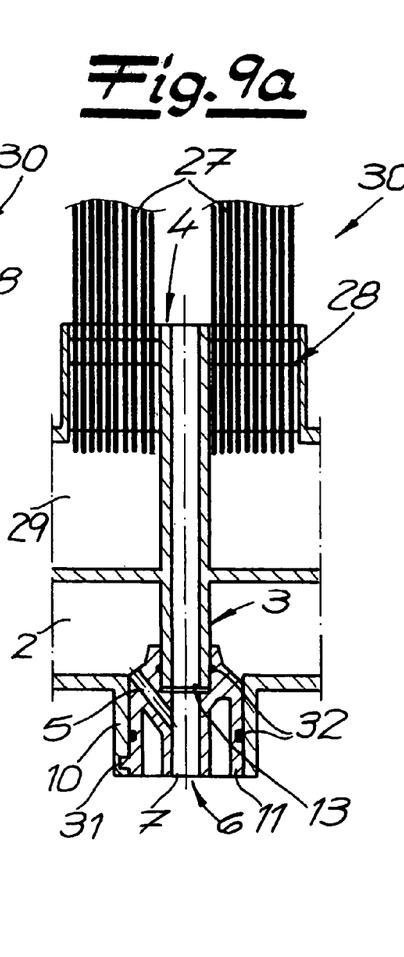
Figures 9B, 9C:
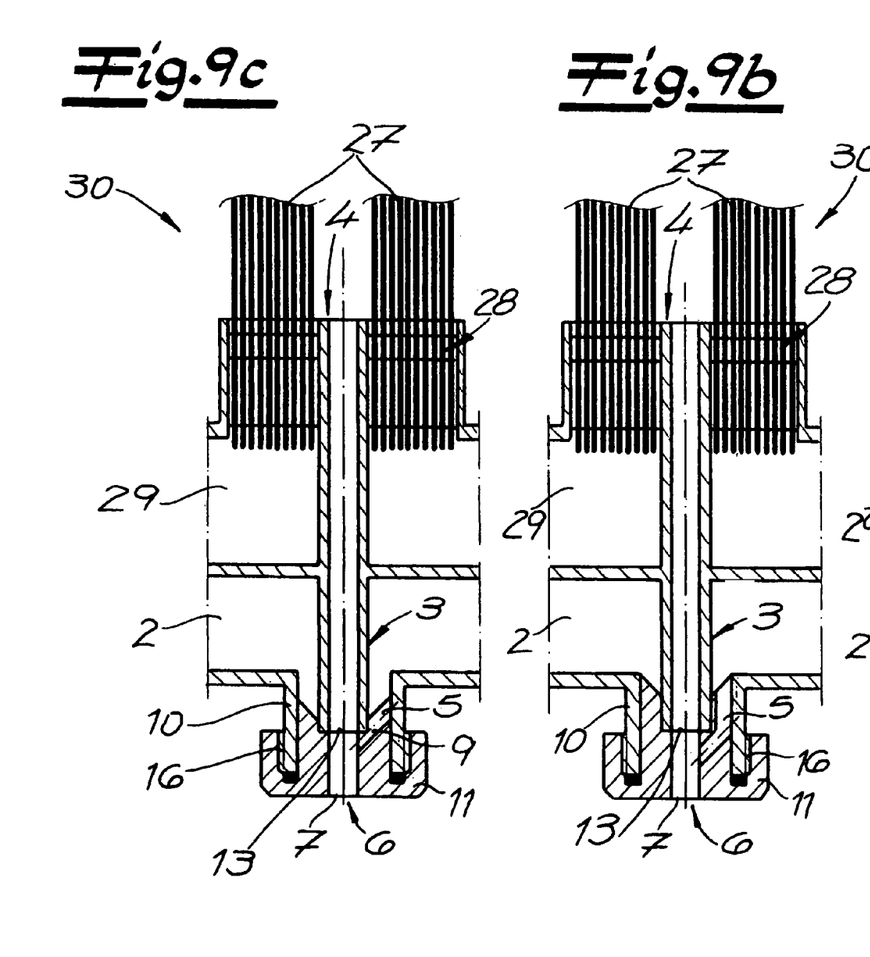

FIGS. 9a through 9c show details of alternative embodiments of the gassing device according to the present invention in a membrane module 30. In the embodiment shown in FIG. 9a, the cover 11 is inserted in the connecting piece 10 and fixed by a bayonet catch 31. The connection channel 5 is formed in the cover 11, so that the cross-section of the connection channel 5 is especially advantageously not changed by mounting irregularities. The extension section 6 formed by the cover 11 directly adjoins the gas lance 3, an elastomer gasket 32 being provided between gas lance 3 and cover 11 and, in addition, connecting piece 10 and cover 11. FIGS. 9b and 9c show embodiments in which the cover 11 is screwed onto the connecting piece 10. While the connection channel 5 is essentially also formed in the cover 11 in the embodiment from FIG. 9b, the embodiment from FIG. 9c has a throttle point 9 between cover 11 and gas lance 3.

Figure 10:
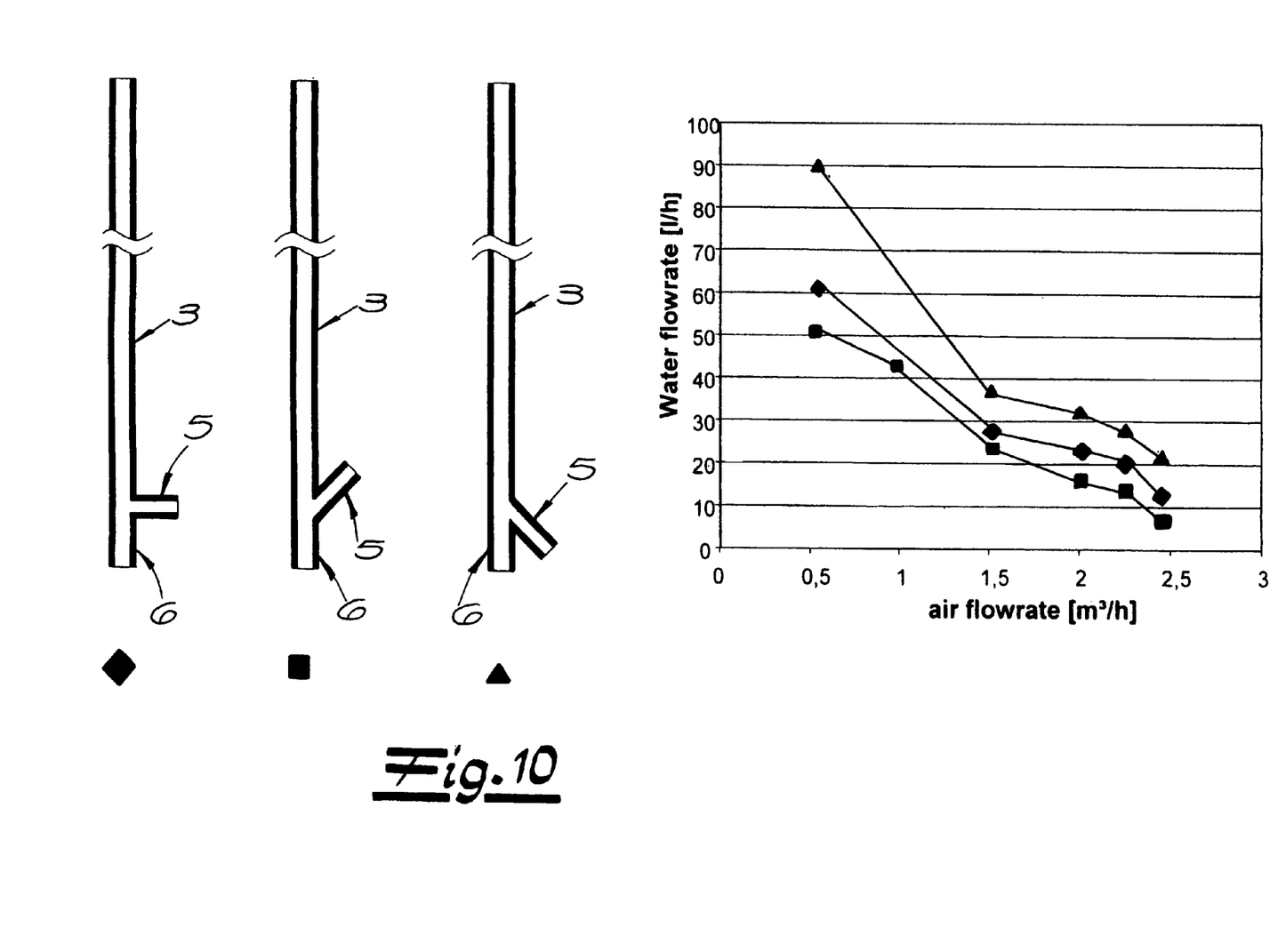

During normal operation of the gassing device, a pressure cushion forms in the extension section 6 having the opening 7, which determines the pressure conditions in the assigned gas lance 3. At small flow rates, however, liquid 1 may enter the gas lance 3 through the extension section 6 and may be transported upward with the gas flow through the gas lance 3. The pumping effect of the device according to the present invention is shown in FIG. 10, the quantity of liquid 1 conveyed by the device being shown as a function of the flow rate of the gas flow.

The invention claimed is:

1. A device for gassing a liquid for membrane facilities used in immersion operation, having a gas supply channel and at least one gas lance from which a gas flow exits in gassing operation, wherein the gas lance is connected to the gas supply channel by means of at least one connection channel comprising a first mouth area on the side of the gas lance and a second mouth area on the side of the gas supply channel and generating as a throttle a flow pressure loss of the gas flow entering the gas lance, and wherein below the first mouth area an extension section is provided, which adjoins the gas lance and has an opening below the first mouth area.

2. The device according to claim 1, wherein the connection channel has a throttle point or has a cross-section over its entire length which is smaller than the cross-section of the gas lance.

3. The device according to claim 1, wherein the second mouth area is arranged in the bottom of the gas supply channel.

4. The device according to claim 1, wherein the connection channel is provided by means of a connecting piece attached to the gas supply channel, wherein the gas lance extends up into a receiving chamber of the connecting piece, and wherein a cover is located on the connecting piece, which is open on the bottom and forms the extension section.

5. The device according to claim 4, wherein the connection channel has a throttle point at the end of the gas lance plunging into the receiving chamber.

6. The device according to claim 5, wherein the cover has an inner face, which encloses the end of the gas lance with an annular gap, which forms the throttle point.

7. The device according to claim 4, wherein the cover has a depression, which is opposite to the end of the gas lance and forms a flow calming chamber of the extension section, and wherein the cover-side opening discharges into the flow calming chamber.

8. The device according to claim 4, wherein a throttle valve comprising two valve bodies is situated in an annular chamber delimited by the connecting piece and the gas lance, the first valve body being situated on the end of the gas lance and bridging the annular chamber between the gas lance and the connecting piece as well as having gas passage openings, and the second valve body having a valve seat working together with the gas passage openings, and being situated in a chamber between the cover and the first valve body.

9. The device according to claim 8, wherein the second valve body has a passage, which forms a flow calming chamber of the extension section behind the throttle point and is aligned with the opening in the cover.

10. The device according to claim 1, wherein the gas lance ends without a constriction and without a cap freely in the liquid to be gassed at its end projecting from the gas supply channel.

11. The device according to claim 10, wherein the gas lance has a diffuser expansion at its upper end projecting from the gas supply channel.

12. The device according to claim 1, wherein the gas lance is enclosed by a bundle of hollow fiber membranes, which is embedded at one end in a head piece and discharges into a permeate collecting chamber separated from the gas supply channel.

13. The device according to claim 1, wherein the extension section passes continuously into the gas lance, the extension section and the gas lance having the same cross-section.

14. The device according to claim 1, wherein the gas lance and/or the extension section has a conical course in at least some sections.

15. The device according to claim 1, wherein multiple gas lances are connected to the gas supply channel, from which gas flows exit simultaneously in gassing operation, the gas lances are each connected via at least one separate said connection channel to the gas supply channel, the connection channels generating a flow pressure loss of the gas flows entering the gas lances as throttles, and said extension section is provided below each of the connection channels, which has said opening below the assigned connection channel and adjoins the assigned gas lance.

* * * * *